United States Patent [19]
Pritchard et al.

[11] Patent Number: 5,837,172
[45] Date of Patent: Nov. 17, 1998

[54] METHOD FOR MANUFACTURING AN AUTOMOTIVE TRIM PRODUCT

[75] Inventors: James R. Pritchard, Somersworth; Lawrence R. Nichols, Dover, both of N.H.

[73] Assignee: Davidson Textron Inc., Dover, N.H.

[21] Appl. No.: 892,740

[22] Filed: Jul. 15, 1997

Related U.S. Application Data

[63] Continuation of Ser. No. 549,879, Oct. 30, 1995, abandoned.

[51] Int. Cl.⁶ .......................... B29C 44/06; B29C 44/12
[52] U.S. Cl. ...................... 264/46.4; 249/124; 264/45.1; 264/46.6; 264/255; 264/257; 264/271.1
[58] Field of Search .................. 249/124; 264/45.1, 264/46.4, 46.5, 46.6, 255, 257, 271.1

[56] References Cited

U.S. PATENT DOCUMENTS

| | | | |
|---|---|---|---|
| 3,534,129 | 10/1970 | Bartel | 264/255 |
| 4,420,447 | 12/1983 | Nakashima | 264/46.5 |
| 4,544,126 | 10/1985 | Melchert | 264/46.7 |
| 4,714,575 | 12/1987 | Preston | 264/46.4 |
| 5,007,815 | 4/1991 | Shoji | 264/46.6 |
| 5,040,335 | 8/1991 | Grimes | 49/502 |
| 5,176,860 | 1/1993 | Storch | 264/255 |
| 5,232,957 | 8/1993 | Pritchard et al. | 521/174 |
| 5,271,885 | 12/1993 | Denker | 264/46.5 |
| 5,283,918 | 2/1994 | Weingartner et al. | 5/481 |
| 5,401,449 | 3/1995 | Hill et al. | 264/46.4 |

*Primary Examiner*—Allan R. Kuhns
*Attorney, Agent, or Firm*—Reising, Ethington, P.L.L.C.

[57] ABSTRACT

An interior trim component, such as a door panel, having an outer skin backed by a low density molded mat foam substrate and an energy absorbing foam backing is manufactured in a single mold tool in a multiple stage foaming operation in which the outer skin and a glass reinforcement mat are positioned in the mold cavity and a mold insert corresponding to the energy absorbing foam layer is mounted to the lid of the mold tool. A polyurethane precursor mixture is poured into the open mold and the lid closed to generate the low density molded mat substrate. The mold is opened and the mold insert removed and a second urethane precursor mixture is poured onto the substrate and the mold closed to generate the energy absorbing foam backing within the space of the mold cavity previously occupied by the mold insert.

7 Claims, 2 Drawing Sheets

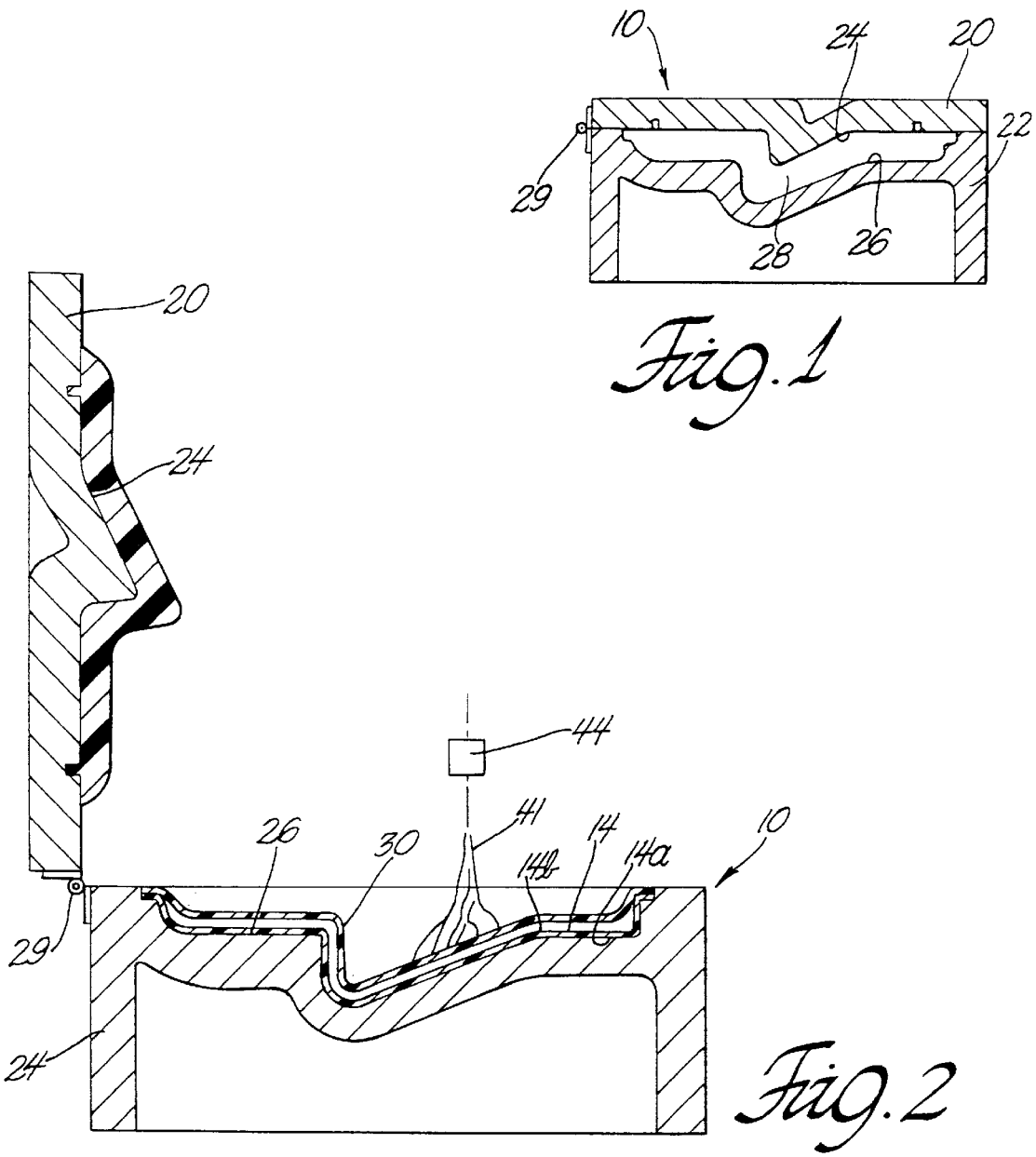

METHOD FOR MANUFACTURING AN AUTOMOTIVE TRIM PRODUCT

This is a continuation of application Ser. No. 08/549,879 filed Oct. 30, 1995, now abandoned.

This invention relates to methods of making interior trim products such as door panels and the like for vehicles having an outer skin backed by multiple foam layers, and particularly to those having an outer skin layer bonded to a low density rigid foam substrate and an energy absorbing foam backing for absorbing the energy of an impact in the event of a collision to protect the occupants of the vehicle.

BACKGROUND OF THE INVENTION

Door panels and other interior trim products have been proposed in the automotive industry for absorbing energy from side impact forces to protect the occupants of the vehicle in the event of a collision. One common type employs an energy absorbing foam bun or panel that is bonded to a composite outer shell comprising a PVC outer skin backed by a low density molded mat substrate. The energy absorbing ("EA") foam acts to absorb energy of an impact through destruction to provide protection to the occupants in the event of a collision. A representative EA foam material is a RIM molded polyurethane composition disclosed in U.S. Pat. No. 5,232,957 and commonly owned by the assignee of the present invention.

The low density molded mat substrate serves as a rigid structural shield overlying the EA foam panel to protect the panel from being irreversibly damaged from low energy impact sustained during ordinary usage of the panel, such as when it is bumped by cargo, kicked by a foot, pressed on by an arm or hand, etc. which, without the protective shell, would impart enough force to the energy absorbing foam panel to cause it irreversible damage.

Both the EA foam panel and the low density molded mat substrate are thus known per se to the art. According to present practice, the skin-covered low density molded mat substrate and the EA foam panel are made apart from one another in two separate, dedicated molds and are then joined after molding by an adhesive to complete the trim product. In one mold, the skin-covered substrate is made by placing an outer flexible skin in a mold cavity and overlying the skin with a mat of glass reinforcement strands that is permeable to foam. A precursor mixture of low density rigid urethane foam-forming materials are reacted in the mold to generate a low density molded mat bonded to the outer skin to produce the resultant protective shell. In another mold dedicated to making just the EA foam backing component, suitable energy-absorbing foam-producing agents are reacted to generate the EA foam backing. The shell and EA foam panel are then joined by a suitable adhesive to complete the trim product.

It is an object of the present invention to lessen the time, labor, and cost associated with producing such an energy absorbing trim component by combining the molding operations in a single mold and eliminating the post-mold joining operation of the panel and shell components.

SUMMARY OF THE INVENTION AND ADVANTAGES

According to the present invention, a method is provided for manufacturing an interior trim article of the type having an outer flexible skin bonded to a low density rigid foam substrate and an EA foam backing in which the foaming and bonding of the substrate and the EA foam backing is carried out in a single mold two stage operation without the use of adhesives. A mold insert is prepared that is representative of the EA foam backing to be formed and is positioned within the cavity of the mold along with a preformed outer skin of flexible material. The mold insert serves to block off and preserve a secondary foam space within the cavity for the subsequent molding of the EA foam backing and is spaced from the outer skin to provide a primary foam space of the cavity therebetween for the initial formation of the substrate.

In a preferred embodiment, a foam-permeable mat of reinforcing glass strands is located within the primary foam space over the outer skin. A first precursor mixture is reacted within the primary foam space to generate therein the low density rigid foam substrate preferably having the glass reinforcement mat embedded therein, and as a result of molding is bonded to the outer skin.

In a subsequent second stage foam molding operation within the same mold tool, the insert is removed to open the secondary foam space and thereafter a second precursor mixture is reacted within the secondary space to generate therein the EA foam backing bonded to the substrate.

The use of the mold insert advantageously allows the foaming and joining of the substrate and the EA foam backing to be carried out within a single mold tool and without adhesives, thus greatly reducing the manufacturing and labor costs and simplifying the process.

The method of this invention has broader application with the same recognized advantages in the manufacture of other interior trim components of the type having an outer flexible skin backed by multiple foam layers. Such trim articles can be manufactured in the same manner within a single mold tool prepared with a mold cavity initially sized to accommodate the outer skin and the formation of each of the multiple foam layers therein. In a first stage foam molding operation, the outer skin is positioned within the mold cavity and the remaining space of the cavity is blocked off except for a first layer foam space adjacent the outer skin. Precursor foamable materials are reacted within the first layer foam space to generate therein a first foam layer bonded to the skin. In subsequent stage foam molding operations, successive portions of the mold cavity are unblocked at each stage to open additional foam spaces, each corresponding to the next successive foam layer to be formed within the mold cavity. In each successive foam space, precursor foamable material is reacted to generate successive foam layers each bonded to the previous foam layer.

Other objects and advantages of the invention will become apparent with reference to the accompanying drawings and the accompanying descriptive matter.

BRIEF DESCRIPTION OF THE DRAWINGS

A presently preferred embodiment of the invention is disclosed in the following description and in the accompanying drawings, wherein:

FIG. 1 is a diagrammatic view of mold tooling used to practice the method of the present invention;

FIGS. 2–5 are diagrammatic views showing various steps in the foam molding method of practicing the present invention.

DETAILED DESCRIPTION OF THE INVENTION

Figure 4:
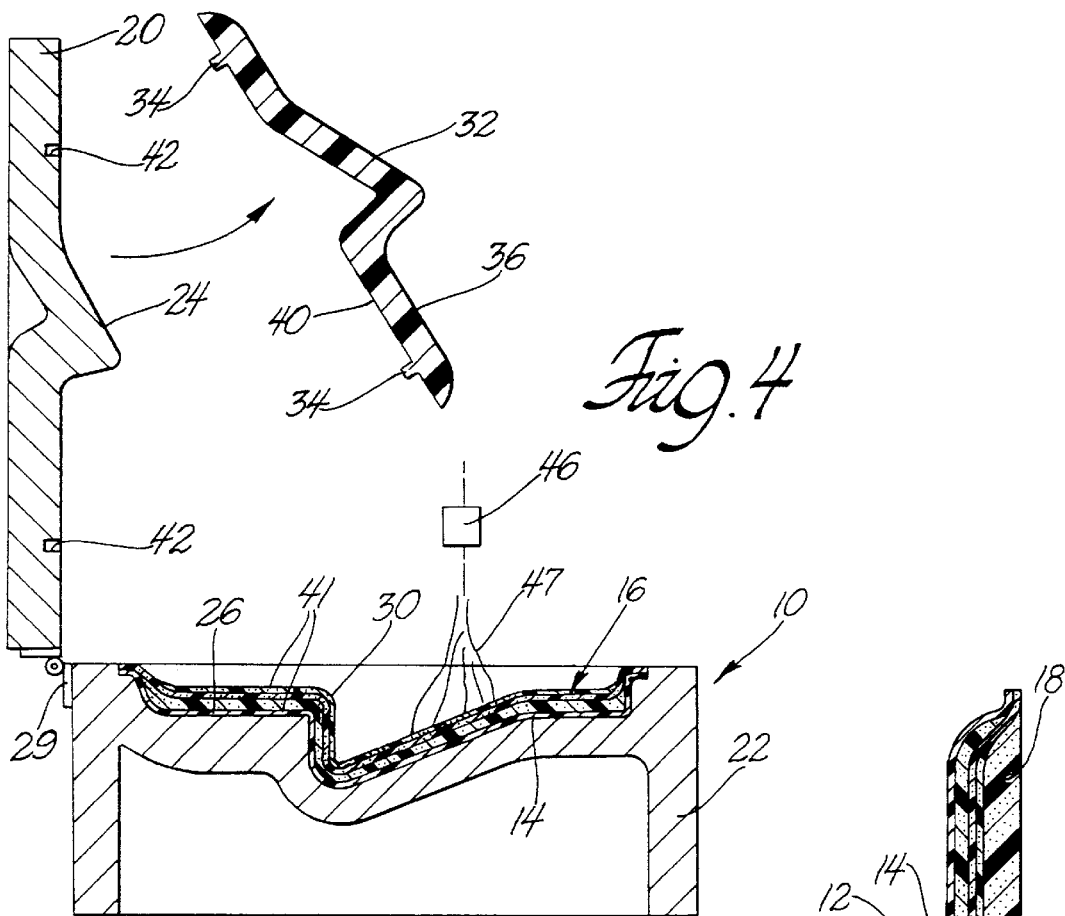
Figure 5:
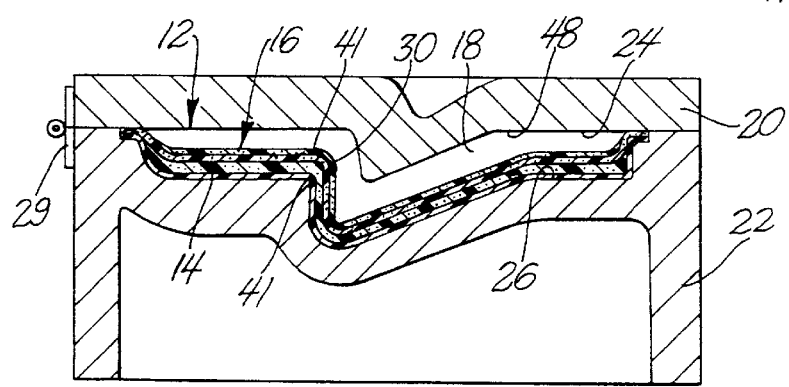
Figure 6:
FIG. 6 is an enlarged diagrammatic cross-sectional view of an interior trim product produced by the method of the present invention.

With reference to the drawings, a molding tool 10 for practicing the method of this invention is shown diagrammatically in FIG. 1 and at various stages of the manufacturing process illustrated in FIGS. 2–5 for manufacturing interior trim products of the type having an outer skin or layer of flexible material backed by multiple foam layers of different compositions and/or properties. One such trim product is an automotive interior door panel assembly 12 illustrated representatively in FIG. 5 comprising an outer facing layer or skin 14 of flexible material, such as polyvinylchloride (PVC) or other foam-impermeable plastics material bonded to a low density rigid foam substrate 16 which, in turn, is backed by a panel of energy absorbing (EA) foam 18.

The outer flexible skin layer 14 is formed by techniques known to the art such as slush molding or dry plastisol casting methods in which a thin layer of PVC material or other thermoformable plastic is produced having an outer finished, and often pebble grained, class A surface 14a, and an opposing, inner surface 14b.

The mold tooling 10 is of the type generally used for molding polyurethane foam products by the reaction injection molding process (hereinafter "RIM"). A representative open pour-type mold tool 10 that can be employed in practicing the method of this invention is illustrated diagrammatically in the drawings and comprises upper and lower mold sections 20, 22 separable at parting plane A and having male and female cavity surface portions 24, 26 respectively, defining a foam molding cavity 28 therebetween when the mold is closed, as illustrated in FIG. 1. The upper mold section (also referred to as the lid or cover of the mold) 20 is joined by a hinge 29 to the lower mold or base 22 allowing the mold to be opened to gain access to the mold cavity 28. The mold cavity 28 is prepared with a size and shape configured to accommodate the outer skin layer 14 and the formation of each of the multiple foam backing layers of the product within the same mold cavity.

In a first stage foam molding operation, the prefabricated skin layer 14 is laid in the mold with the outer class A side 14a facing downward and smoothly supported by the female mold cavity surface 26 of the lower mold section 22, as illustrated in FIG. 2. A preformed foam-permeable rigid reinforcement mat 30 of continuous glass fibers of the same general contour as the outer skin 14 is laid over the skin layer 14 and is stiff enough to support its own mass in spaced relation to the skin layer 14, as illustrated in FIG. 2. One or more spacers (not shown) may also be located between the mat 30 and skin 14 to maintain the spacing therebetween. The usage of such a mat in the formation of a low density molded mat substrate is known per se to the art and illustrated, for example, in U.S. Pat. No. 5,040,335 incorporated herein by reference and which is commonly owned by the assignee of this invention.

A mold insert 32 is prepared that is representative of the EA foam backing or panel 18 to be formed within the mold cavity, such that when placed in the mold cavity 28, the mold insert 32 is able to block off and preserve a portion of the mold cavity space corresponding in size and shape to the EA foam panel 18 to be produced. The mold insert 32 is adapted by suitable fasteners 34 or other means to be releasably mounted on the lid 20, as illustrated in FIG. 2, such that when the mold is closed, as shown in FIG. 3, the mold insert 32 is accommodated within the mold cavity 28 so as to block off and preserve a portion of the mold cavity 28 for the formation of the EA foam panel 18 in a later foam molding operation. An exposed mold surface 36 of the insert 32 is supported in spaced relation to the skin layer 14 to provide therebetween a primary open foam space 38 between the insert 32 and the skin layer 14 when the mold is closed. One suitable means for releasably securing the insert 32 to the mold lid 20 would be push-in directional clip-type fasteners 34 (such as those coined "Christmas tree fasteners" because of their Christmas tree-like configuration) projecting from a backside 40 of the insert 32 and received with a friction fit in aligned openings 42 provided in the mold lid 20.

With the mold 10 open, precursors for a low density rigid foam material 41 are poured through a mix head 44 into the female mold cavity part 26, as illustrated diagrammatically in FIG. 2. The lid 20 is then closed to confine the foam precursors within the primary foam space whereupon the precursors are allowed to react and expand in a known manner to impregnate the glass mat 30 and fill the primary foam space 38 to generate a low density molded mat substrate 16 within the primary foam space. The composite substrate 16 comprises the low density rigid foam material 41 reinforced with the embedded glass mat 30. The precursor mixture for the substrate may be any of a number of those known in the art to form low density rigid polyurethane foam according to RIM practice, and typically includes an isocyanate component and a polyol blend. A representative precursor mixture is disclosed in U.S. Pat. Nos. 5,040,335 and 4,714,575 commonly owned by the same assignee as this invention and incorporated herein by reference. The low density molded mat substrate 16 has a molded density in the range of 0.4–0.6 g/cc and typically a density of about 0.42 g/cc. This low density molded mat substrate 16 is bonded to the inner side 14b of the skin layer 14 as a result of being molded against the skin and provides a rigid, structural framework for the panel 12 and further serves as a protective shell or barrier for preventing inadvertent damage to the underlying EA foam panel 18 in the final product.

When the substrate 16 has cured, the mold 10 is opened and, as part of a second stage foam molding operation to be carried out in the same mold tool, the mold insert 32 is removed from the lid 20, as illustrated in FIG. 3. When using push-in fasteners 34, the insert 32 may be dismounted from the lid 20 by simply pulling on the insert with enough force to extract the fasteners from their associated openings or sockets 42 of the mold lid 20. To facilitate the separation of the mold insert 32 from the substrate 16, it is advantageous to fabricate the mold insert 32 in such manner that its mold surface 36 is rendered non-adherent to the molded foam of the substrate 16. This may be accomplished, for example, by molding the insert from plastics materials, such as polypropylene or polyethylene or other plastics material, that characteristically are non-adherent to polyurethane foam such that the foamed substrate 16 does not adhere and thus will release without damage from mold surface 36 of the insert 32. The fasteners 34 could be incorporated as an integral, molded part of the insert 32.

Once the mold insert 32 has been removed and with the mold cover 20 still open, precursors for EA foam material 47 are poured through mix head 46 onto the molded substrate 16, as illustrated in FIG. 4. The mold cover 20 is then closed (FIG. 5) to confine the EA precursor material 47 within a secondary foam space 48 of the cavity once occupied by the mold insert 32. The foam precursors 47 are allowed to expand in known manner so as to fill the secondary foam space 48 and bond with the substrate 16 to generate the EA foam panel 18 within the secondary foam space 48. The precursor material for the energy absorbing foam panel 18 may be any of a number of known materials, such as those used to produce RIM molded energy absorbing polyurethane foam. Representative formulations of such energy absorbing foam-producing material is disclosed in U.S. Pat. No. 5,232, 957, commonly owned by the assignee of the present invention and incorporated herein by reference. The EA foam panel 18 has a relatively higher density than that of the substrate 16 and generally in the range of 0.07–0.12 g/cc with a typical value of about 0.09 g/cc.

This multi-stage foam molding process produces good adhesion of the skin layer 14 to the foam backing layers and of the foam backing layers to one another. The disclosed multi-stage foam molding technique within a single mold tool can be used to manufacture other trim components as well of the type having an outer flexible skin layer backed by multiple foam layers. For example, in the case of a trim component having three foam backing layers, the first layer would be formed in the manner described above for producing the substrate 16 utilizing a foam insert that occupies and hence blocks off all of the mold cavity space except that for producing a first foam layer. A similar, smaller mold insert (not shown) could be utilized in a subsequent foam molding operation to block off all but the space needed to form the next subsequent layer, and finally the second mold insert being removed to form the third foam layer in the mold cavity in the manner described above. It will be appreciated that additional foam layers could be formed within the same mold cavity by use of additional mold inserts or by other means of blocking off and unblocking successive portions of the mold cavity to form each foam layer.

While a particular embodiment for practicing the invention has been described in the foregoing specification and accompanying drawings, it is to be understood that the invention is not limited to the exact method described and that other methods and variations may be possible in the spirit of the invention and without departing from the scope of the appended claims. For example, the foam precursors could be injected into their respective foam spaces of the cavity once the mold is closed through suitable passages in the mold tooling according to closed mold RIM processes known to the art and disclosed, for example, in U.S. Pat. No. 4,714,575 commonly owned by the assignee of this invention and incorporated herein by reference.

The disclosed embodiment is representative of a presently preferred form of the invention, but is intended to be illustrative rather than definitive thereof. The invention is defined in the claims.

We claim:

1. A method of manufacturing an interior trim article having an outer flexible skin bonded to a low density rigid foam substrate and an energy absorbing foam backing, the method comprising the steps of:

preparing a mold insert representing the energy-absorbing foam backing to be formed;

preparing an outer skin of flexible material;

in a first stage foam molding operation, (a) positioning the mold insert in a mold cavity of an openable foam molding tool made from first and second mold sections and releasably mounted to one of said first and second mold sections to block off and preserve a secondary foam space in the cavity for subsequent molding of the energy absorbing foam backing, (b) positioning the outer skin in the mold cavity in spaced relation to the mold insert to provide a primary foam space between the skin and mold insert, and (c) reacting a first precursor mixture within the primary foam space to generate therein a low density rigid foam structural substrate bonded to the skin; and in a subsequent stage foam molding operation within the same molding tool made from said first and second mold sections, (a) removing the mold insert from the mold cavity and releasing it from the respective mold section to open the secondary foam space, and (b) reacting a second precursor mixture within the secondary space to generate therein an energy absorbing foam backing bonded to the substrate for absorbing the energy of an impact imparted to the article.

2. In the method of claim 1, providing a molding surface on the mold insert that is nonadherent to the foam substrate generated within the primary foam space to facilitate the separation of the mold insert from the substrate.

3. In the method of claim 2, forming the mold insert from nonadherent plastics material.

4. In the method of claim 1, locating a foam-permeable reinforcement mat within the primary foam space and embedding the mat within the low density foam to generate a reinforced low density molded mat substrate within the primary foam space.

5. In the method of claim 1, said first and second mold sections are respective upper and lower mold parts; having opposed cavity-defining surface portions defining the mold cavity therebetween when the mold parts are in a closed position and which parts are to gain access to the mold cavity, and wherein:

in step (a) of the first molding stage, opening the mold parts and locating the skin within cavity portion of the lower mold and positioning a foam-permeable mat of glass strand fibers over the skin, and in step (b) mounting the mold insert on one of the mold parts, and in step (c) pouring the first precursor mixture into the lower mold cavity portion and thereafter closing the mold parts to generate a low density molded mat substrate;

and thereafter in step (a) of the second foam molding stage, opening the mold parts and removing the mold insert from the respective mold part and in step (b) pouring the second precursor mixture onto the molded mat substrate and thereafter closing the mold via the upper and lower mold parts to generate the energy absorbing foam backing within the secondary foam space.

6. In the method of claim 5, producing an automotive interior door panel as the resultant trim article.

7. A method of manufacturing an interior door panel assembly of an automotive vehicle having an outer flexible skin bonded to a low density molded mat substrate and an energy-absorbing foam backing panel, the method comprising the steps of:

preparing a mold insert representing the energy-absorbing foam backing panel to be formed;

preparing an outer skin of flexible plastics material;

in a first stage foam molding operation, (a) positioning the mold insert in a mold cavity of a foam molding tool, said mold insert releasably mounted to an openable and closable mold tool to block off and preserve a secondary foam space in the cavity for subsequent formation of the energy-absorbing foam backing panel, (b) locating the outer skin in the mold cavity and positioning a reinforcement mat of glass strands over the skin with the skin being spaced from the mold insert to define a primary foam space therebetween, and (c) reacting a first precursor mixture of low density rigid urethane foam-producing materials within the first foam space within the mold tool when closed to generate therein a low density molded mat substrate bonded to the skin; and in a subsequent second stage foam molding operation within the same molding tool, (a) removing the mold insert from the mold cavity and releasing it from said mold tool, and (b) reacting a second precursor mixture of energy-absorbing foam-producing materials within the second foam space in said mold tool when closed to generate therein an energy-absorbing foam backing panel bonded in situ to the molded mat substrate.

* * * * *